United States Patent
Abbott et al.

(10) Patent No.: US 6,205,093 B1
(45) Date of Patent: Mar. 20, 2001

(54) READ ONLY INPUT SYSTEM PROVIDING CONTROL INFORMATION ENCODED IN A BAR CODE LABEL FOR AUTOMATED DATA STORAGE LIBRARY

(75) Inventors: Perry Ed Abbott; Frank David Gallo; Michael Philip McIntosh; Raymond Yardy, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,847

(22) Filed: Jul. 24, 1998

(51) Int. Cl.⁷ .................................................. G11B 17/22
(52) U.S. Cl. ................................. 369/34; 360/92
(58) Field of Search .................................. 369/34, 30, 36, 369/37, 38, 39, 178; 360/92; 710/1, 13; 700/57, 64; 235/383, 454, 456, 462.01–462.09, 462.11–462.16

(56) References Cited

U.S. PATENT DOCUMENTS

| | | | |
|---|---|---|---|
| 5,059,772 | 10/1991 | Younglove | 235/383 |
| 5,303,214 * | 4/1994 | Kulakowski et al. | 369/34 |
| 5,426,581 | 6/1995 | Kishi et al. | 364/167.01 |
| 5,450,385 | 9/1995 | Ellis et al. | 369/34 |
| 5,568,455 * | 10/1996 | Balsom | 369/30 |
| 5,581,522 | 12/1996 | Sibuya et al. | 369/36 |
| 5,613,154 | 3/1997 | Burke et al. | 395/821 |
| 5,729,464 * | 3/1998 | Dimitri | 364/478.03 |
| 5,819,309 * | 10/1998 | Gray | 711/111 |
| 5,956,198 * | 9/1999 | Kulakowski et al. | 360/71 |
| 5,956,301 * | 9/1999 | Dimitri et al. | 369/34 |
| 6,005,734 * | 12/1999 | Shimada et al. | 360/69 |
| 6,038,490 * | 3/2000 | Dimitri et al. | 700/214 |
| 6,064,543 * | 5/2000 | Tatsuda | 360/92 |

* cited by examiner

Primary Examiner—Tan Dinh
(74) Attorney, Agent, or Firm—John H. Holcombe; Robert M. Sullivan

(57) ABSTRACT

A read only input system provides a source of information for a controller of an automated data storage library, separate from the controller stored microcode, and that will be available for use by the controller after the controller microcode has been updated or restored. The read only input system comprises a bar code reader mounted on an accessor of the library and coupled to the controller for providing the output of the bar code reader to the controller, and a bar code label mounted in the automated data storage library, positioned at a predetermined fixed location. The bar code label encodes input control information for the controller, which is read by the bar code reader and supplied to the controller. The bar code label input control information may comprise an offset value for at least one of the X, Y and Z direction coordinates of the accessor in order to align the accessor. The bar code label input control information may also comprise engineering change information, and/or may comprise product option information.

23 Claims, 4 Drawing Sheets

READ ONLY INPUT SYSTEM PROVIDING CONTROL INFORMATION ENCODED IN A BAR CODE LABEL FOR AUTOMATED DATA STORAGE LIBRARY

TECHNICAL FIELD

This invention relates to automated data storage libraries, and, more particularly, to automated data storage libraries having a bar code scanner mounted on an accessor.

BACKGROUND OF THE INVENTION

Automated data storage libraries are known for providing cost effective access to large quantities of stored data. Generally, data storage libraries include a large number of storage slots at which are stored portable data storage media. The typical portable data storage media is a tape cartridge or an optical cartridge. An accessor typically accesses the data storage media from the storage slots and delivers the accessed media to a data storage drive for reading and/or writing data on the accessed media. One or more controllers both operate the accessor to access the media and operate the data storage drives to transmit and/or receive data from an attached on-line host computer system.

In a conventional automated data storage library, the storage slots are arranged in a planar orthogonal arrangement forming a "wall" of storage slots for holding data storage media. The plane may be a flat plane, or may be a cylindrical surface. To double the storage capacity, two "walls" of storage slots may be provided on either side of the accessor.

A number of different companies manufacture automated data storage libraries today, each model displaying various different features. One example is the IBM 3494 Data Storage Library, which stores magnetic tape cartridges.

A library controller typically comprises a microprocessor, including a disk drive, and input/output adapters, such as SCSI ports. The disk drive typically stores the programs (microcode) which cause the controller to operate the library, and include information indicating the characteristics of the particular library. For example, not all libraries are identical, and the particular library may have a particular set of options. Further, the particular library may include a particular set of engineering changes. The programs for the controller may be installed or updated by a typical input device, such as a CD-ROM optical drive, but the specific instructions characterizing the specific library are typically manually entered or manually selected, and the specific instructions are typically stored on the disk drive.

The controller disk drive is subject to "crashes" or other failures requiring replacement of the disk drive. The microcode may be restored on the replacement disk drive by installing the microcode at the CD-ROM, but the specific instructions characterizing the specific library would be lost, and would have to be manually entered or manually selected. A difficulty is that there may be no record known by or available to the operator or the disk drive installer to identify the specific characterization of the library.

As taught by IBM Technical Disclosure Bulletin, Vol. 36, No. 06B, pages 545–7, P. Chang et al., "Teach Mastering Process for an Automated Tape Library", June 1993, (hereinafter, P. Chang et al. IBM TDB) an automated data storage library having a vision system calibration sensor mounted on the accessor, may use the calibration sensor to calibrate the positioning of a picker gripper relative to the calibration sensor of the accessor, and then the calibration sensor detects targets aligned with the location of the storage slots, so that the accessor may correctly access the desired data storage media from the storage slots.

In the typical automated data storage library, the accessor moves in orthogonal X and Y directions to position a picker at a desired storage slot. The picker then moves a gripper in the Z direction to grip the desired data storage medium located in the storage slot and then the picker retracts the gripper to pick the desired data storage medium from the storage slot. The accessor then transports the data storage medium to a new desired location.

This alignment between the accessor and the storage slots is required to ensure that the accessor can successfully pick data storage media from and return them to the storage slots in a reliable manner. In large automated data storage libraries, such as the IBM 3494 Data Storage Library, this alignment to each of banks of storage slots is conducted at the time of manufacture and checked again at the time of installation in the customer's facility.

After any calibration sensor and accessor misalignment is corrected (or "taught") in accordance with the P. Chang et al., IBM TDB, the alignment with respect to a target is checked, the target having been aligned with a bank or group of storage slots. For example, one target may be associated with a common grouping or bank of storage slots on one side of the accessor, and another target associated with another common grouping or bank of storage slots on the opposite side of the accessor. The accessor is typically moved to a "home" location, and the X and Y coordinates of the accessor are set to zero by the controller. Then the accessor and calibration sensor are moved to the expected location of a desired target. The calibration sensor may then scan the target to detect any misalignment between the expected location of the target and its actual location. The X and Y coordinates of the actual location of the target is stored in a table in a data base of the controller and later used to direct the accessor to retrieve a desired data storage media at a desired storage slot. This teaching process and the table are conventionally stored in the controller disk drive.

It has been found that, after calculating the misalignments, a constant misalignment, or offset, may exist in the library. Typically, this offset is in the vertical, or Y, direction, resulting in the accessor being misaligned by a small percentage of a storage slot height. Although the accessor may initially work with the small misalignment offset, the accessor may not provide consistent reliability.

This offset may be evaluated during the manufacturing process by observing whether consistent and reliable operation can be performed throughout an operating window. For example, the accessor may be moved off center by a small amount, and the accessing operation checked. The results of the observed performance can be used to compute the offset needed. The resultant offset may be manually entered into a database of the library controller, such as the above calibration table.

However, when the controller microcode is altered or upgraded, the manually entered offset may be deleted, as may the target calibration. The microcode may operate the accessor in accordance with the P. Chang et al. IBM TDB to calibrate the accessor and the target locations, but the offset required for consistent reliability may be unknown or unavailable to the operator.

Further, the controller disk drive may fail as described above, and the offset may be unknown or unavailable to either the operator or the disk drive installer when the microcode is restored.

It may be possible to adjust a master target located on a teach master bracket for the calibration sensor to correct any deviation from perfect, however this results in machines with different teach master brackets or sensors that cannot be easily replaced in the field and is an adjustment that would be costly to perform.

SUMMARY OF THE INVENTION

An object of the present invention is to provide a source of information for the library controller separate from the controller disk drive and stored microcode that will be available for use by the controller after the controller microcode has been updated or restored.

Disclosed is a read only input system for a controller of an automated data storage library, the library having a accessor operated by the controller. The read only input system comprises a bar code reader mounted on the accessor and coupled to the controller for providing the output of the bar code reader to the controller, and a bar code label mounted in the automated data storage library, positioned for reading by the bar code reader, the bar code label encoding input control information for the controller.

The library controller may operate the accessor to position the bar code reader at a predetermined home location, and the bar code label may be positioned at the predetermined home location.

The accessor may be movable in at least two of the X, Y and Z directions, and have a home position at which the controller establishes predetermined values of coordinates for the at least two of the X, Y and Z directions for the accessor at the home position. The bar code label input control information may comprise an offset value for at least one of the X, Y and Z direction coordinates.

Alternatively or additionally, the bar code label input control information may comprise engineering change information, and/or the bar code label input control information may comprise product option information.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
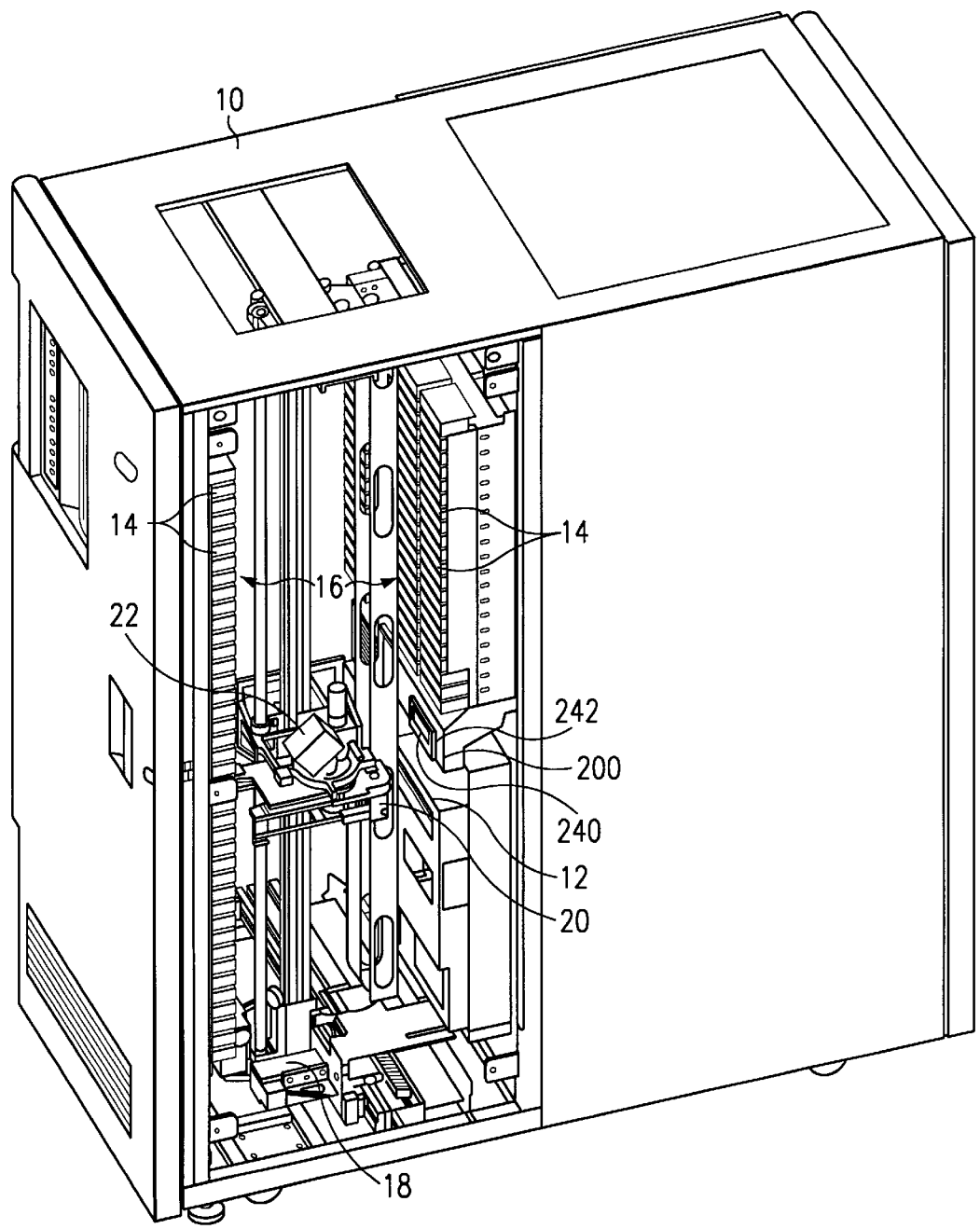
FIG. 1 is a perspective view of an automated data storage library employing the read only input system of the present invention.
Figure 2:
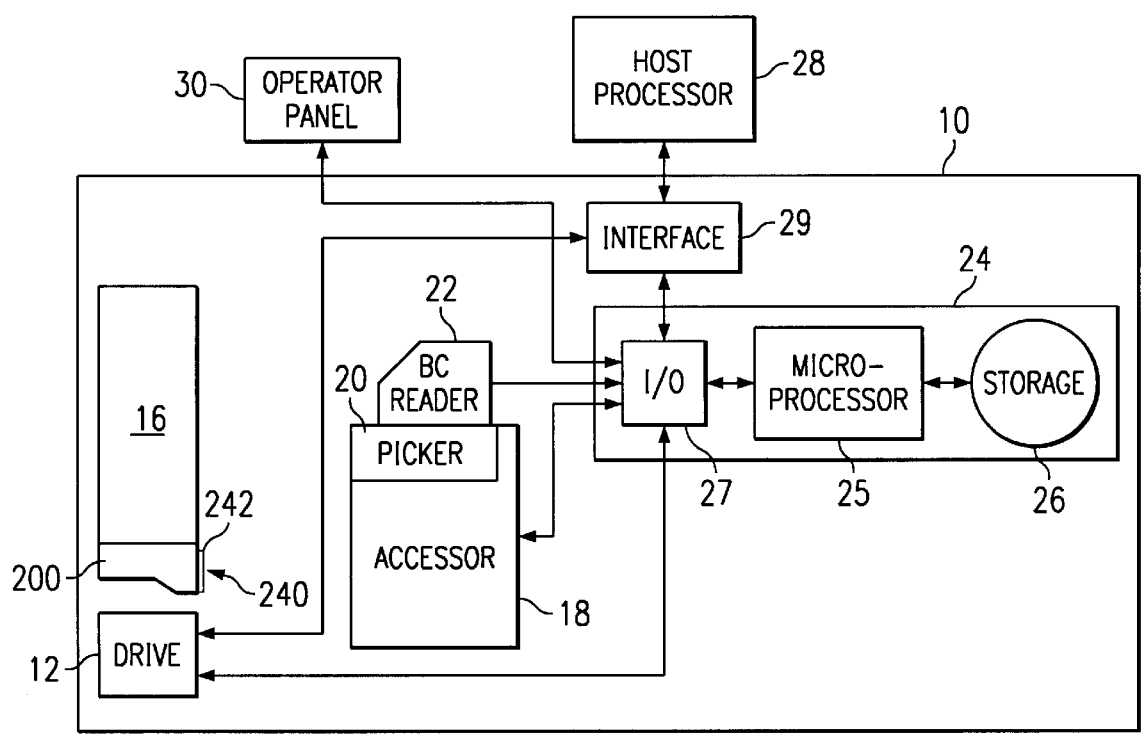
FIG. 2 is a block diagram of the automated data storage library of FIG. 1.

Referring to FIGS. 1 and 2, an automated data storage library 10 is illustrated employing the read only input system of the present invention. The automated data storage library includes one or more data storage drives 12, for example, for reading and/or writing on data storage media, such as magnetic tape cartridges. The present invention is equally applicable to automated data storage libraries which store data storage media such as optical disk cartridges, optical tape cartridges, magnetic tape cassettes, etc. A plurality of data storage media, such as magnetic tape cartridges 14, are stored in banks or groups of storage slots 16. An accessor 18, including a cartridge picker 20 and a bar code reader 22 mounted on the picker, transports a selected cartridge 14 between a storage slot 16 and a drive 12.

An example of an automated data storage library 10 is the IBM 3494 Data Storage Library, which stores magnetic tape cartridges.

The library 10 also includes a library controller 24 which comprises at least one micro-processor 25, including a disk drive 26, and input/output adapters 27, such as SCSI ports. The library controller 24 may comprise any suitable microprocessor, such as an IBM RS/6000 processor. The disk drive 26 stores programs (microcode) which cause the controller to operate the library, and stores information indicating the characteristics of the particular library. The controller is coupled with, and controls the operation of accessor 18, and interfaces with the drives 12. The controller 24 is further coupled to an operator panel 30, and is also coupled to a host processor 28, typically via an interface 29. The controller 24 receives access commands from the host processor 28 for the selection and transport of cartridges 14 between storage slots 16 and drives 12. The host processor 28 may be coupled to the drives 12, and information to be recorded on, or to be read from, selected cartridges 14 is transmitted between the drives 12 and the host 28.

As described above, not all libraries are identical, and the particular library may have a particular set of options. Further, the particular library may include a particular set of engineering changes, either at the time of manufacture, or after upgrades in the field. The programs for the controller 24 may be installed or updated by a typical input device, such as a CD-ROM optical drive, but the specific instructions characterizing the specific library are typically manually entered or manually selected at operator panel 30, and the specific instructions are typically stored on the disk drive 26.

Figure 3:
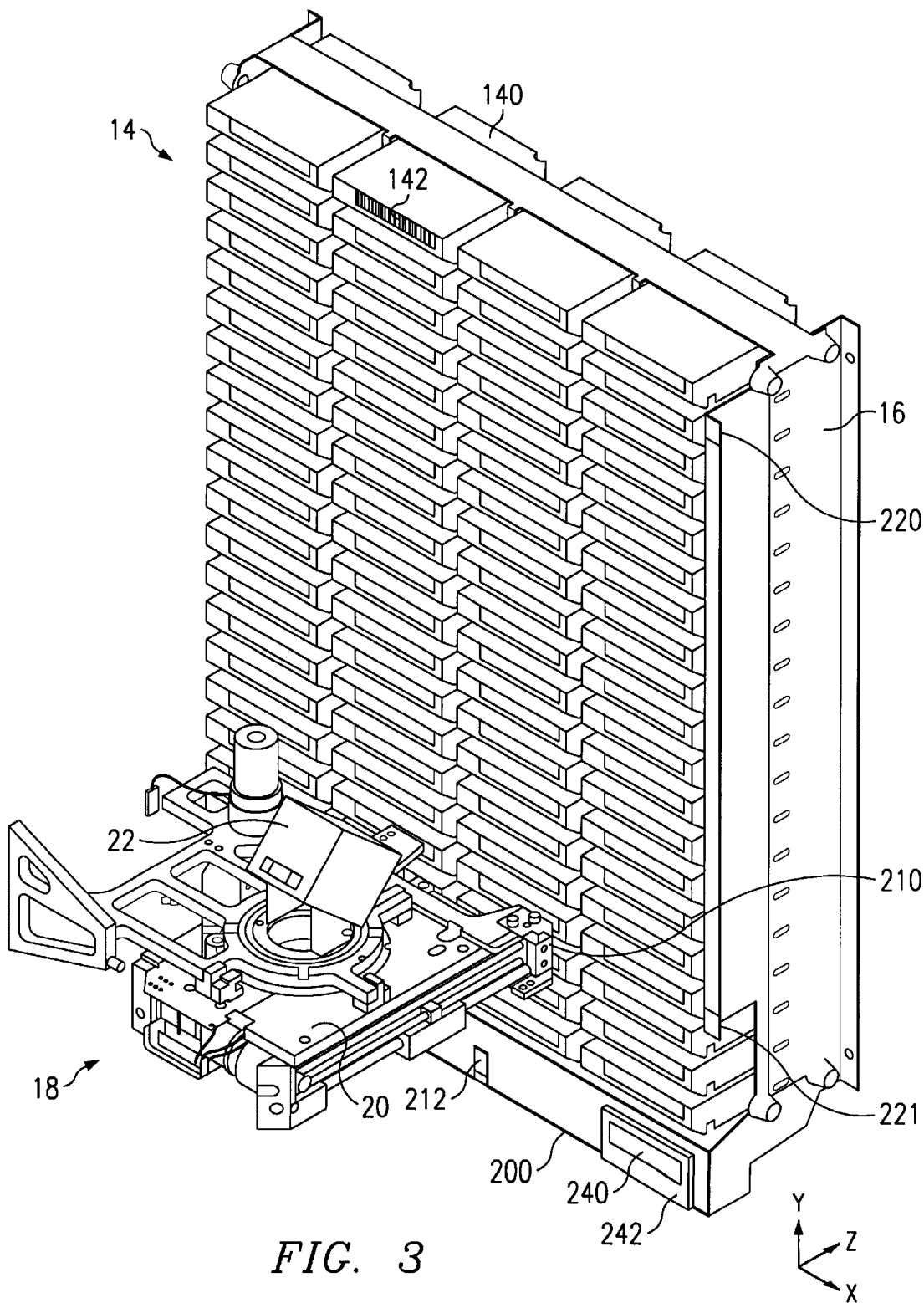
FIG. 3 is an illustration of the accessor and bar code reader in proximity to a bank of storage slots of FIG. 1.

FIG. 3 is an illustration of the picker 20 and bar code reader 22 in front of a bank of storage slots 16 storing a plurality of cartridges 14. The storage slots 16 are arranged in a planar orthogonal arrangement forming groups, or banks, of storage slots for holding data storage media. The plane may be a flat plane, or may be a cylindrical surface. To double the storage capacity, two banks of storage slots may be provided on either side of the accessor, as illustrated in FIG. 1.

The bar code reader 22 may comprise the Micro Scan, series 610, for example. The cartridges 14, such as cartridge 140, each includes a bar code identifier 144 on an edge thereof which may be read by the bar code reader 22 as the media is stored at a storage slot 16. The identifier of a data storage media is typically read by the bar code reader as mounted on the accessor, and the identifier is provided to the library controller for verifying that the accessor is positioned so as to access the correct media.

As described in the P. Chang et al. IBM TDB, when a library is assembled, each bank of storage slots may not be perfectly aligned with each other bank in one or more of the three coordinates, X, Y or Z, and, further, may also not be parallel with the axes of motion of the accessor 18. Consequently, the P. Chang et al. IBM TDB provides a means for determining the positional misalignments of the banks of storage slots 16 as described above.

In large automated data storage libraries, such as the IBM 3494 Data Storage Library, the operation and alignment of the bar code reader are checked, and then a calibration of the alignment of the accessor to each of banks of storage slots is conducted at the time of manufacture and checked again at the time of installation in the customer's facility.

First, the controller 24 checks the operation of the bar code reader 22 by having the accessor 18 move the bar code reader to a teach master bracket 200 to read a test pattern. Next, the bar code reader 22 is aligned with respect to the accessor. This alignment is necessary to insure that the bar code reader is identifying the data storage media at the same storage slot that the accessor will access. This alignment may be made by detecting the test pattern or other target, for example, by detecting the top edge of the targeting bracket. Any deviation from the theoretical position will be automatically compensated for by applying the appropriate offset when positioning the scanner, or may be adjusted manually by adjusting the position or pointing of the bar code reader.

Figure 4:
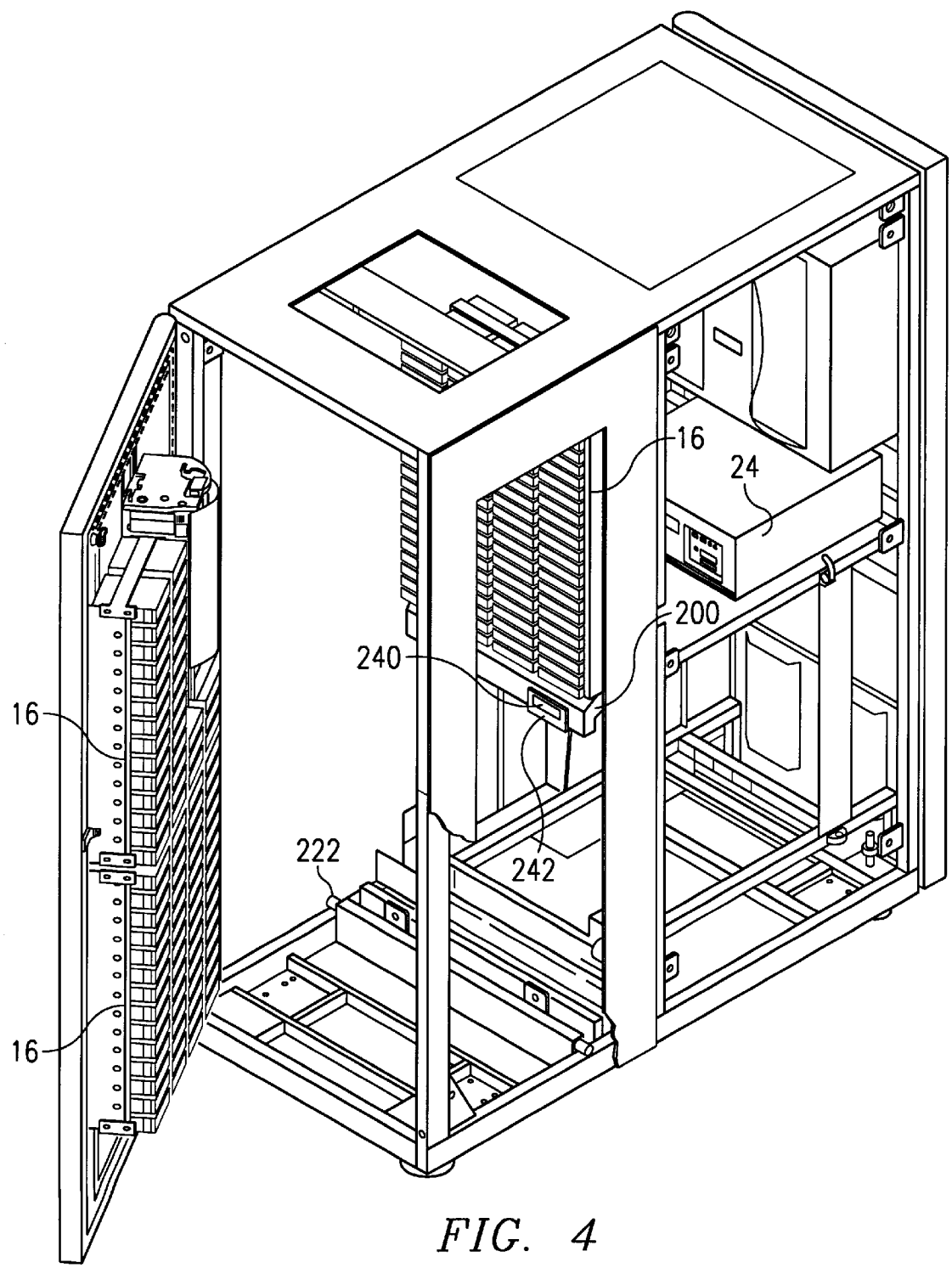
FIG. 4 is a perspective view of the automated data storage library of FIG. 1 without a accessor.

Next, any calibration sensor and accessor misalignment is checked (or "taught") in accordance with the P. Chang et al. IBM TDB. Referring to FIGS. 3 and 4, for example, a calibration sensor 210 reads a reference target 212 while a sensor hand (not shown) mounted at the picker gripper detects a physical location (not shown) on the master bracket 200, to calibrate the positioning of the picker gripper with respect to the calibration sensor's view of the reference target 212. One or more targets 220 and 221 may be associated with a common grouping or bank of storage slots on one side of the accessor, and other targets associated with another common grouping or bank of storage slots on the opposite side of the accessor. The accessor is moved to a "home" location, for example, at sensor 222, and the X and Y coordinates of the accessor are set to zero by the controller. Then the accessor 18 and calibration sensor 210 are moved to the expected location of a desired target 220 or 221. The calibration sensor may then scan the target to detect any misalignment between the expected location of the target 220 and/or 221 and its actual location. The X and Y coordinates of the actual center (or corner) of the target are stored in a table in a data base of the controller and later used to direct the accessor to retrieve a desired data storage media at a desired storage slot. This teaching process and the table are conventionally stored in the controller disk drive.

As described above, it has been found that, after calculating the misalignments, a constant misalignment, or offset, of all of the targets may exist in the library. Typically, this offset is in the vertical, or Y, direction, resulting in the accessor being misaligned by a small percentage of a storage slot height. Although the accessor may initially work with the small misalignment offset, the accessor may not provide consistent reliability.

This offset may be evaluated during the manufacturing process by observing whether consistent and reliable operation can be performed throughout an operating window. For example, the accessor may be moved off center by a small amount, and the accessing operation checked. The results of the observed performance can be used to compute the offset needed. The resultant offset may be manually entered into a database of the library controller, such as the above calibration table.

However, when the controller microcode is altered or upgraded, the manually entered offset may be deleted, as may the target calibration. The microcode may operate the accessor in accordance with the P. Chang et al. IBM TDB to calibrate the accessor, but the offset required for consistent reliability may be unknown or unavailable to the operator.

Further, the controller disk drive may fail as described above, and the offset may be unknown or unavailable to either the operator or the disk drive installer when the microcode is restored.

Also as described above, if either because of a replacement of the disk drive requiring restoration of the microcode, or because of an upgrade to the microcode, the specific instructions characterizing the specific library (e.g., options or engineering changes) would be lost, and would have to be manually entered or manually selected. A difficulty is that there may be no record known by or available to the operator or the disk drive installer to identify the specific characterization of the library.

Figure 5:
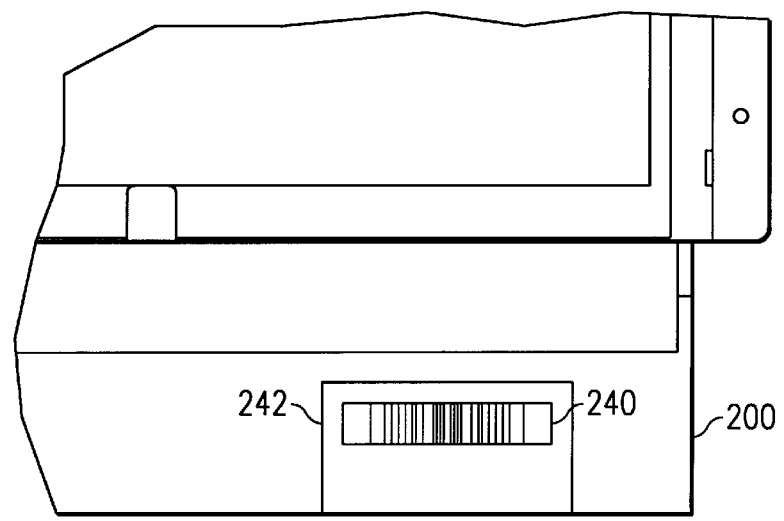
FIG. 5 is an illustration of a read only element of the present invention.

Referring additionally to FIGS. 3 and 5, in accordance with the present invention, a read only input system is provided for a controller of an automated data storage library. The read only input system comprises the bar code reader 22 mounted on the accessor 18 and coupled to the controller for providing the output of the bar code reader to the controller, and a bar code label 240 mounted in the automated data storage library, positioned at a predetermined fixed location 242 on teach master bracket 200, the bar code label 240 encoding input control information for the controller.

Referring additionally to FIGS. 1 and 2, the library controller 24 may operate the accessor 18 to position the bar code reader 22 at the predetermined fixed location 242, and read the bar code label 240 input control information.

The accessor 18 may be movable in at least two of the X, Y and Z directions, and have a home position (222 in FIG. 4) at which the controller establishes predetermined (zero) values of coordinates for the at least two of the X, Y and Z directions for the accessor at the home position. As described above, the plurality of storage slots 16 may be located in groups, each of the groups having one or more registration targets 220 and 221 for the accessor readable by the calibration sensor 210. The bar code label 240 input control information comprises an offset value from at least one of the home position X, Y and Z direction coordinates, to be applied in selected operations of the accessor. For example, the offset value may be selected to bring the apparent location of the registration targets 220 and 221 relative to the storage slots, and others, within desired tolerances, such as by providing a offset value in the vertical, or Y, direction. Thus, the controller 24 may calculate the location of the registration target with respect to the accessor home position, as adjusted by the offset value of bar code label 240.

Additionally, other calibration information, such as servo gain or offset may be provided as input control information for the bar code label 240.

Alternatively or additionally, the bar code label 240 input control information may comprise engineering change information, and/or the bar code label input control information may comprise product option information. The bar code label 240 thereby protects this vital product information across changes to software or changes to control system hardware (e.g., disk drive).

As the result, should the disk drive 26 "crash" and the microcode restored, or should the microcode be updated, the input control information will be retrieved by the bar code reader 22 from the bar code label 240 upon the controller 24 operating the accessor 18 to move the bar code reader 22 to the predetermined fixed position 242. Thus, a simple command, often already included in the microcode, when the library is changed from one mode of operation to another (e.g., from pause mode to auto mode) tests the bar code reader 22 for functionality by moving the bar code reader to the predetermined fixed position 200. The testing results in reading, not a hard code identifier or test pattern, but, rather, the input control information of bar code label 240. An interrupt in the microcode to respond to the presence of the bar code label input control information, will load the input control information into the desired table(s) and data base(s) of the controller 24, as is well known to those of skill in the art.

It is desirable to make the bar code label 240 substantially similar in dimensions to the bar code identifiers 142 of the data storage media 140.

Alternative predetermined fixed locations for the bar code label 240 may be envisioned by those of skill in the art. Additionally, those of skill in the art may envision other input control information to be provided by the bar code label 240.

While the preferred embodiments of the present invention have been illustrated in detail, it should be apparent that modifications and adaptations to those embodiments may occur to one skilled in the art without departing from the scope of the present invention as set forth in the following claims.

We claim:

1. In an automated data storage library having a plurality of storage slots for storing data storage media having bar code identifiers, at least one accessor for accessing said data storage media in said plurality of storage slots, a bar code reader mounted on said accessor, and a controller coupled to said bar code reader for detecting the output of said bar code reader and coupled to said accessor for operating said accessor, said controller storing programs for operating said library and control information indicating characteristics of said library, a read only element comprising:
    a bar code label mounted in said automated data storage library, positioned for reading by said bar code reader, said bar code label comprising encoded input said control information particularized for said controller.

2. The read only element of claim 1, wherein said accessor is operable by said controller to position said bar code reader at a predetermined fixed location, and wherein said bar code label is positioned at said predetermined fixed location.

3. The read only element of claim 2, wherein said accessor is movable in at least two of the X, Y and Z directions, and has a home position at which said controller establishes predetermined values of coordinates for said at least two of the X, Y and Z directions for said accessor at said home position, and wherein said encoded input control information of said bar code label comprises an offset value from at least one of said X, Y and Z direction coordinates to be applied in selected operations of said accessor.

4. The read only element of claim 2, wherein said accessor is movable in at least the vertical direction, and has a home position at which said controller establishes predetermined values of coordinates for said at least vertical direction for said accessor at said home position, and wherein said encoded input control information of said bar code label comprises an offset value for at least said vertical direction coordinates.

5. The read only element of claim 2, wherein said encoded input control information of said bar code label comprises engineering change information.

6. The read only element of claim 2, wherein said encoded input control information of said bar code label comprises product option information.

7. The read only element of claim 1, wherein said library additionally comprises a teach master bracket for positioning of said bar code reader with respect to said accessor and for testing the operation of said bar code reader thereat, and wherein said bar code label is positioned at said teach master bracket.

8. The read only element of claim 7, wherein said accessor is movable in at least two of the X, Y and Z directions, and has a home position at which said controller establishes predetermined values of coordinates for said at least two of the X, Y and Z directions for said accessor at said home position, wherein said plurality of storage slots are located in groups, each of said groups having a registration target for said accessor readable by a calibration sensor, said controller calculating the location of said registration target with respect to said accessor home position, and wherein said encoded input control information of said bar code label comprises an offset value from at least one of said home position X, Y and Z direction coordinates, said offset value selected to bring said apparent location of said registration target within desired tolerances.

9. The read only element of claim 1, wherein said data storage media comprises tape media having said bar code identifiers positioned at one edge thereof, and wherein said bar code label comprises substantially the same dimensions as said bar code identifiers.

10. A read only input system for a controller of an automated data storage library having a accessor, said accessor operated by said controller, said controller storing programs for operating said library and control information indicating characteristics of said library, comprising:
    a bar code reader mounted on said accessor and coupled to said controller for providing the output of said bar code reader to said controller; and
    a bar code label mounted in said automated data storage library, positioned for reading by said bar code reader, said bar code label comprising encoded input said control information particularized for said controller.

11. The read only input system of claim 10, wherein said accessor is operable by said controller to position said bar code reader at a predetermined fixed location, and wherein said bar code label is positioned at said predetermined fixed location.

12. The read only input system of claim 11, wherein said accessor is movable in at least two of the X, Y and Z directions, and has a home position at which said controller establishes predetermined values of coordinates for said at least two of the X, Y and Z directions for said accessor at said home position, and wherein said encoded input control information of said bar code label comprises an offset value from at least one of said X, Y and Z direction coordinates to be applied in selected operations of said accessor.

13. The read only input system of claim 11, wherein said encoded input control information of said bar code label comprises engineering change information.

14. The read only input system of claim 11, wherein said encoded input control information of said bar code label comprises product option information.

15. An automated data storage library, comprising:
    a plurality of storage slots for storing data storage media having bar code identifiers;
    at least one accessor for accessing said data storage media in said plurality of storage slots;
    a bar code reader mounted on said accessor;

a controller coupled to said bar code reader for detecting the output of said bar code reader and coupled to said accessor for operating said accessor, said controller storing programs for operating said library and control information indicating characteristics of said library; and a bar code label positioned for reading by said bar code reader, said bar code label comprising encoded input said control information particularized for said controller.

16. The automated data storage library of claim 15, wherein said accessor is operable by said controller to position said bar code reader at a predetermined fixed location, and wherein said bar code label is positioned at said predetermined fixed location.

17. The automated data storage library of claim 16, wherein said accessor is movable in at least two of the X, Y and Z directions, and has a home position at which said controller establishes predetermined values of coordinates for said at least two of the X, Y and Z directions for said accessor at said home position, and wherein said encoded input control information of said bar code label comprises an offset value from at least one of said X, Y and Z direction coordinates to be applied in selected operations of said accessor.

18. The automated data storage library of claim 16, wherein said accessor is movable in at least the vertical direction, and has a home position at which said controller establishes predetermined values of coordinates for said at least vertical direction for said accessor at said home position, and wherein said encoded input control information of said bar code label comprises an offset value for at least said vertical direction coordinates.

19. The automated data storage library of claim 16, wherein said encoded input control information of said bar code label comprises engineering change information.

20. The automated data storage library of claim 16, wherein said encoded input control information of said bar code label comprises product option information.

21. The automated data storage library of claim 15, wherein said library additionally comprises a teach master bracket for positioning of said bar code reader with respect to said accessor and for testing the operation of said bar code reader thereat, and wherein said bar code label is positioned at said teach master bracket.

22. The automated data storage library of claim 21, wherein said accessor is movable in at least two of the X, Y and Z directions, and has a home position at which said controller establishes predetermined values of coordinates for said at least two of the X, Y and Z directions for said accessor at said home position, wherein said plurality of storage slots are located in groups, each of said groups having a registration target for said accessor readable by a calibration sensor, said controller calculating the location of said registration target with respect to said accessor home position, and wherein said encoded input control information of said bar code label comprises an offset value from at least one of said home position X, Y and Z direction coordinates, said offset value selected to bring said apparent location of said registration target within desired tolerances.

23. Automated data storage library of claim 15, wherein said data storage media comprises tape media having said bar code identifiers positioned at one edge thereof, and wherein said bar code label comprises substantially the same dimensions as said bar code identifiers.

* * * * *